March 16, 1937. E. CHRISTIANSEN 2,073,731
PIE OR LIKE FILLING OR DEPOSITING APPARATUS
Filed Feb. 25, 1936 2 Sheets-Sheet 1

E. Christiansen
INVENTOR
By CA Snow & Co.
ATTORNEYS

March 16, 1937. E. CHRISTIANSEN 2,073,731
PIE OR LIKE FILLING OR DEPOSITING APPARATUS
Filed Feb. 25, 1936 2 Sheets-Sheet 2

E. Christiansen
INVENTOR

By CASnow&Co.
ATTORNEYS.

Patented Mar. 16, 1937

2,073,731

UNITED STATES PATENT OFFICE 2,073,731

PIE OR LIKE FILLING OR DEPOSITING APPARATUS

Ejnar Christiansen, Birmingham, England

Application February 25, 1936, Serial No. 65,677
In Great Britain February 26, 1935

5 Claims. (Cl. 107—1)

This invention comprises certain improvements in or relating to pie or like filling or depositing apparatus, of the type in which the material is delivered through an outlet in measured quantities into a pie casing or the like.

According to the present invention, the delivery outlet is adapted to be raised after each discharge. In the case of viscous material, after the predetermined quantity has been ejected from the nozzle into a pie casing or the like, such material is liable to adhere to the material left in the nozzle and will consequently prevent a clean deposit. By sharply raising the discharge nozzle after each deposit, the material in the pie casing is separated from the material in the nozzle and besides ensuring the delivery of an accurate predetermined quantity there will be no side drag or drip, when the pie casing is moved laterally. The lowered position of the nozzle may be adjustable in relation to the bottom of the pie casing or the like, in order that variable conditions of the deposit can be provided for; for instance if the nozzle is lowered to a position near the bottom of the pie casing the deposited material can be spread outwardly. The invention is particularly applicable for use in conjunction with an automatic pie or like moulding machine in which a number of moulding tins are mounted on a revolving table and successively fed to the moulding tool, and by this invention also the nozzle is adapted to be raised and lowered by means of the reciprocating moulding tool. The discharge nozzle is preferably mounted on the end of a pivotally mounted arm which forms a delivery conduit and such arm is raised and lowered by means of an arm which is fixed to the reciprocating moulding tool, the arrangement being such that the reciprocating arm is stationary for the discharge period or a portion of such period.

Referring to the drawings:—

Figure 1:
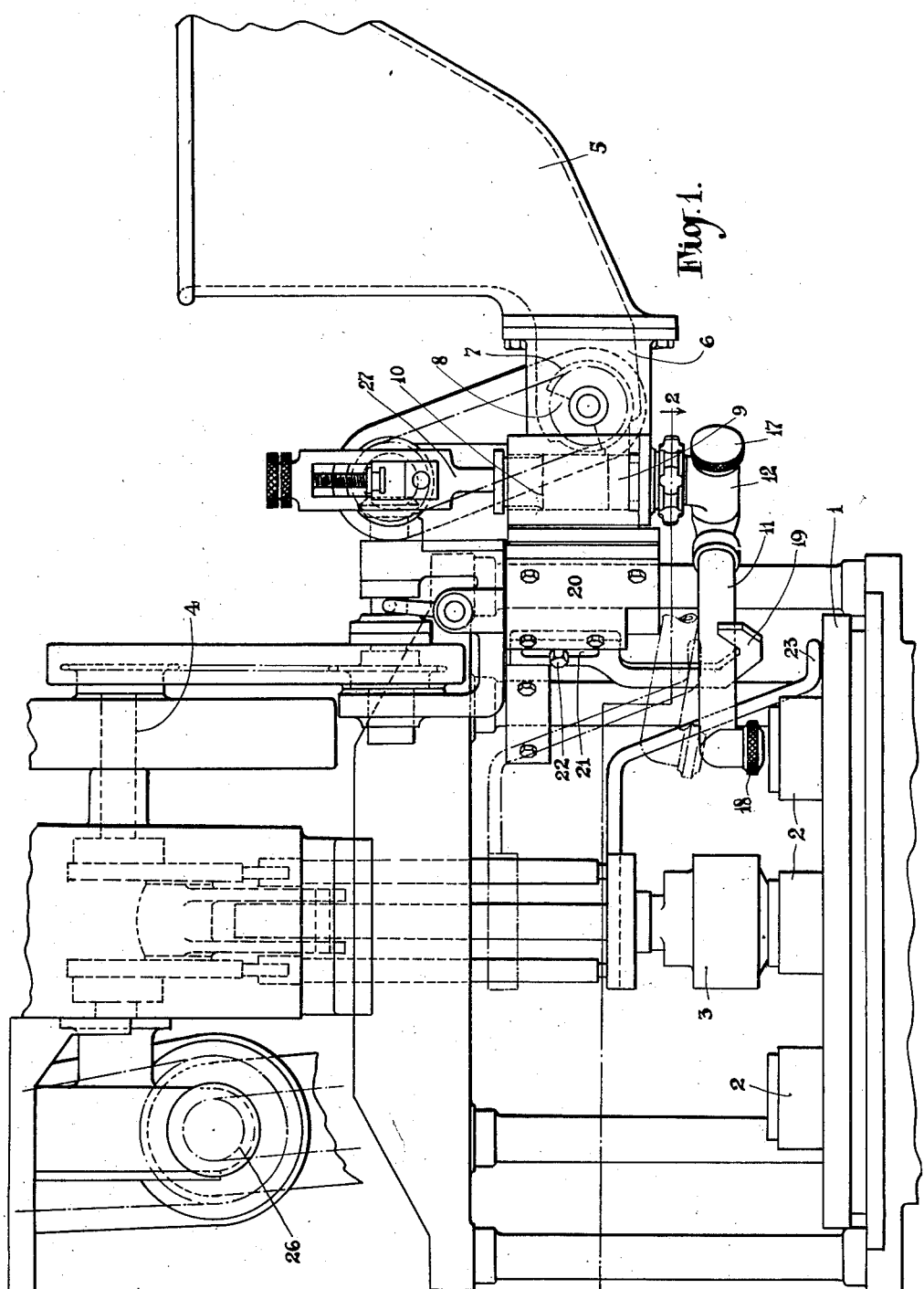
Figure 1 is a side elevation of a device constructed according to this invention.
Figure 2:
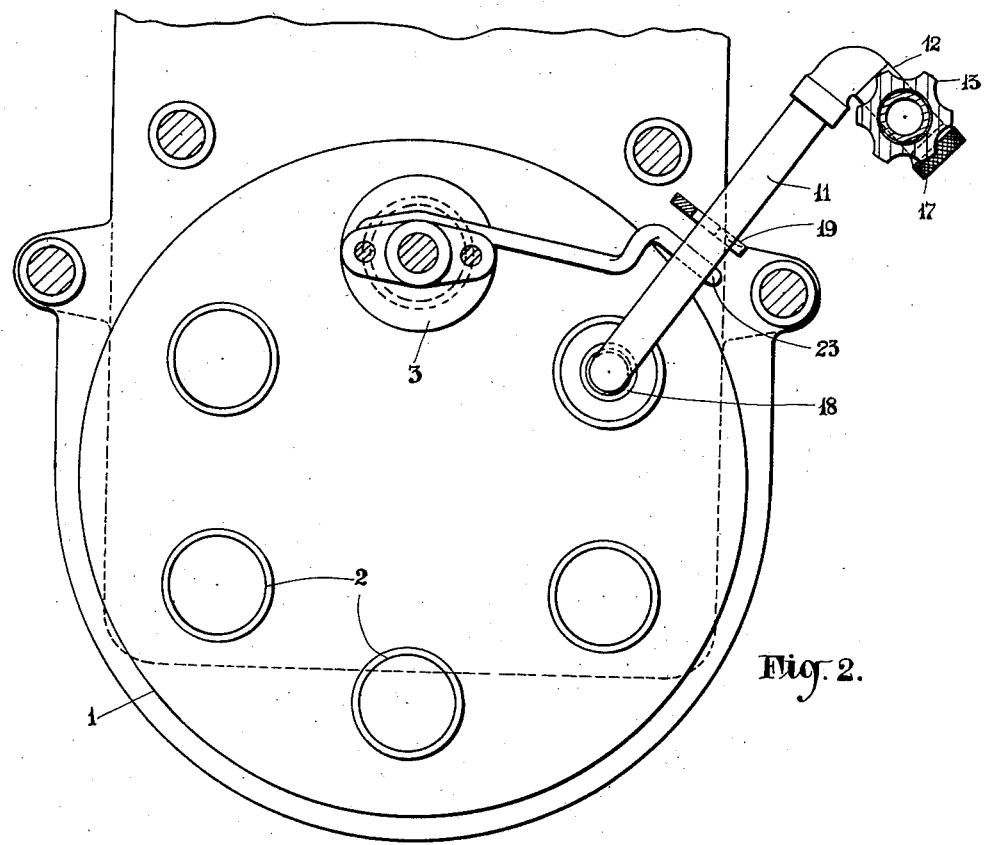
Figure 2 is a sectional plan on line 2—2 of Figure 1.
Figure 3:
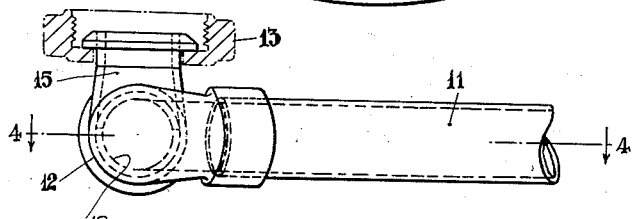
Figure 3 is an elevation of the swivel end of the delivery pipe.
Figure 4:
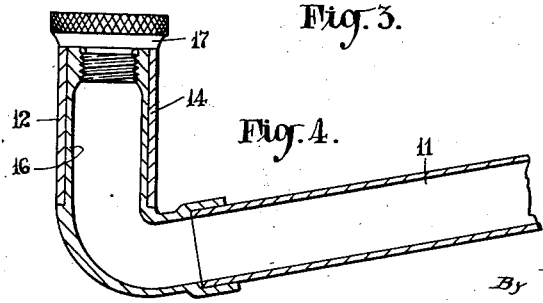
Figure 4 is a section on line 4—4 of Figure 3.

According to a convenient embodiment, the invention is applied to an automatic pie moulding machine, comprising a table 1 carrying platforms 2 in which moulding tins are placed to be successively fed under the moulding tool 3 reciprocated from the crank shaft 4. The table 1 is intermittently revolved step by step by any known mechanism driven from the drive gear 26 also geared to the crank shaft 4. The material for filling the pie casing is ejected from a measuring device of any suitable construction. In the form illustrated the material passes from the hopper 5 to the feed chamber 6 in which rotates the feed valve 7 having the recess 8 which feeds the material through an opening into the piston chamber 9. The valve 7 closes the opening during the ejecting stroke of the piston 10. The piston 10 ejects a predetermined quantity of material into the delivery pipe 11. The piston is reciprocated by the connecting rod 27 driven, through a suitable drive, from the crank shaft 4. A bracket 12 is fixed to the outlet of this measuring device by the nut 13, such bracket comprising a horizontal bearing sleeve 14 from the cylindrical wall of which projects an extension 15. An elbow tube 16 is rotatably mounted in this sleeve 14 and one end is closed by a screwed cap 17 while the other end carries the delivery tube 11. The elbow tube is adapted to receive the material from the measuring device and at the same time it can be oscillated in the bearing bracket. The outer end of the delivery tube 11 is elbow shaped and is screwed to detachably receive a delivery nozzle 18. The delivery nozzle therefore can be interchanged with other nozzles in accordance with the material to be delivered and any desired conditions of deposition. An adjustable stop 19 is fixed to the frame member 20 and when the delivery nozzle is in the lowered position it rests on this stop, and by adjusting the stop, the nozzle can be lowered to any desired distance from the bottom of the pie casing. The stop 19 comprises a hook shaped arm which has a slot 21 through which a screw pin 22 passes to adjustably fix the stop to a frame member 20. The swivelling pipe 11 carrying the nozzle 18 is raised and lowered by means of an arm 23 which is fixed to the reciprocating mechanism carrying the moulding tool 3. The arm 23 is suitably cranked to pass under the swivelling pipe 11 and is so arranged that the nozzle reaches the lowest position permitted by the adjustable stop 19 aforementioned before the reciprocating mechanism carrying the arm 23 aforementioned reaches the bottom of its stroke. When the swivelling pipe 11 therefore reaches the adjustable stop the lifting arm 23 continues its movement and therefore leaves a timed period before the lifting arm returns to lift the swivelling pipe. During this period the discharge takes place and when the nozzle is sharply raised the material delivered into the pie casing is sharply separated from the material in the nozzle. The reciprocating pie lifting mechanism is preferably such that a quick return action is obtained to quickly effect the said separation of the material. With this construction a pie casing can be filled at one position on the intermittently revolving table 1 simultaneously with the moulding of a pie casing by the moulding tool 3 at another position of the table. When the swivelling pipe 11, carrying the nozzle is raised, the pipe is preferably in a position inclining upwardly from the swivelling bracket, so that the pressure on the material at the delivery nozzle will be reduced thereby preventing liability of dripping between the intermittent discharges.

I claim:—

1. A pie filling machine comprising a device for intermittently ejecting measured quantities of material to be deposited, a delivery pipe having a discharge nozzle, a swivel joint connecting the delivery pipe to the outlet of the said ejecting device, and means for raising the delivery pipe after each discharge so that the material deposited is separated from the material remaining in the nozzle.

2. A pie filling machine comprising a device for intermittently ejecting measured quantities of material to be deposited, a delivery pipe having a discharge nozzle, a reciprocating pie forming tool, and means whereby the said reciprocating tool raises the delivery pipe after each discharge.

3. A pie filling machine comprising a device for intermittently ejecting measured quantities of material to be deposited, a delivery pipe having a discharge nozzle, a reciprocating pie forming tool, means whereby the said reciprocating tool raises the delivery pipe after each discharge, and an intermittently rotating table for feeding a pie to the discharge nozzle simultaneously with a mould to the pie forming tool.

4. A pie filling machine comprising a device for intermittently ejecting measured quantities of material to be deposited, a delivery pipe having a discharge nozzle, a swivel joint connecting the delivery pipe to the outlet of the said ejecting device, a reciprocating pie forming tool, an arm on the reciprocating forming tool which lies under the said delivery pipe to raise such pipe with the raising of the said reciprocating tool, and a stop for limiting the lower position of the delivery pipe.

5. A pie filling machine comprising a device for ejecting measured quantities of material to be deposited, an intermittently rotating feed table, frame members on the side of such table to which the said ejecting device is fixed, a delivery pipe having a discharge nozzle, a swivel joint connecting the delivery pipe to the outlet of the said ejecting device, a reciprocating pie forming tool, means whereby the reciprocating forming tool raises the delivery pipe after each discharge, and a stop for limiting the lower position of the nozzle on the delivery pipe so that a time period is allowed in such lower position for the discharge to take place during which time period the forming tool travels to the end of its stroke and rises a distance before commencing to raise the delivery pipe.

E. CHRISTIANSEN.